US008095771B2

(12) United States Patent
Sheu et al.

(10) Patent No.: US 8,095,771 B2
(45) Date of Patent: *Jan. 10, 2012

(54) METHOD AND SYSTEM FOR CACHING ADDRESS TRANSLATIONS FROM MULTIPLE ADDRESS SPACES IN VIRTUAL MACHINES

(75) Inventors: John Te-Jui Sheu, Redmond, WA (US);
David S. Bailey, Redmond, WA (US);
Eric P. Traut, Bellevue, WA (US);
Renee Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

This patent is subject to a terminal disclaimer.

(21) Appl. No.: 12/098,766

(22) Filed: Apr. 7, 2008

(65) Prior Publication Data
US 2008/0215848 A1 Sep. 4, 2008

Related U.S. Application Data

(63) Continuation of application No. 11/128,982, filed on May 13, 2005, now Pat. No. 7,363,463.

(51) Int. Cl.
*G06F 12/00* (2006.01)
(52) U.S. Cl. .................... 711/203; 711/206; 718/108
(58) Field of Classification Search .................... None
See application file for complete search history.

(56) References Cited

U.S. PATENT DOCUMENTS

| | | | |
|---|---|---|---|
| 5,179,680 A | 1/1993 | Colwell et al. | |
| 5,317,705 A | 5/1994 | Gannon et al. | |
| 5,586,283 A | 12/1996 | Lopez-Aguado et al. | |
| 5,617,553 A | 4/1997 | Minagawa et al. | |
| 5,699,543 A | 12/1997 | Saxena | |
| 5,787,494 A | 7/1998 | DeLano et al. | |

(Continued)

FOREIGN PATENT DOCUMENTS
GB   2 376 761 A   12/2002
(Continued)

OTHER PUBLICATIONS

Chang, MS et al., "Lazy TLB Consistency for Large-Scale Multiprocessors," IEEE, http://ieeexplore.ieee.org/iel3/4457/12637/00581683.pdf?tp=&arnumber=581683&isnumber=12637&htry=2, 1997, 308-315.

(Continued)

*Primary Examiner* — Kaushikkumar Patel
(74) *Attorney, Agent, or Firm* — Woodcock Washburn LLP

(57) ABSTRACT

A method of virtualizing memory through shadow page tables that cache translations from multiple guest address spaces in a virtual machine includes a software version of a hardware tagged translation look-aside buffer. Edits to guest page tables are detected by intercepting the creation of guest-writable mappings to guest page tables with translations cached in shadow page tables. The affected cached translations are marked as stale and purged upon an address space switch or an indiscriminate flush of translations by the guest. Thereby, non-stale translations remain cached but stale translations are discarded. The method includes tracking the guest-writable mappings to guest page tables, deferring discovery of such mappings to a guest page table for the first time until a purge of all cached translations when the number of untracked guest page tables exceeds a threshold, and sharing shadow page tables between shadow address spaces and between virtual processors.

16 Claims, 5 Drawing Sheets

U.S. PATENT DOCUMENTS

| | | | |
|---|---|---|---|
| 6,038,639 | A | 3/2000 | O'Brien |
| 6,075,938 | A | 6/2000 | Bugnion et al. |
| 6,182,195 | B1 | 1/2001 | Laudon et al. |
| 6,308,231 | B1 | 10/2001 | Galecki et al. |
| 6,442,666 | B1 | 8/2002 | Stracovsky |
| 6,453,387 | B1 | 9/2002 | Lozano |
| 6,496,847 | B1 | 12/2002 | Bugnion et al. |
| 6,681,311 | B2 | 1/2004 | Gaskins et al. |
| 6,721,839 | B1 | 4/2004 | Bauman et al. |
| 6,785,886 | B1 * | 8/2004 | Lim et al. ............ 718/1 |
| 6,907,600 | B2 | 6/2005 | Neiger et al. |
| 6,925,547 | B2 | 8/2005 | Scott et al. |
| 6,993,453 | B2 | 1/2006 | Krissell |
| 7,069,389 | B2 | 6/2006 | Cohen |
| 7,069,413 | B1 | 6/2006 | Agesen et al. |
| 7,111,145 | B1 | 9/2006 | Chen et al. |
| 7,111,146 | B1 | 9/2006 | Anvin |
| 7,149,832 | B2 | 12/2006 | Wieland et al. |
| 7,167,970 | B2 | 1/2007 | Jacobson et al. |
| 7,188,229 | B2 | 3/2007 | Lowe |
| 7,191,440 | B2 | 3/2007 | Cota-Robles et al. |
| 7,209,994 | B1 | 4/2007 | Klaiber et al. |
| 7,222,221 | B1 * | 5/2007 | Agesen et al. ............ 711/141 |
| 7,225,441 | B2 | 5/2007 | Kozuch et al. |
| 7,299,337 | B2 | 11/2007 | Traut et al. |
| 7,330,942 | B2 | 2/2008 | Dinechin et al. |
| 7,334,142 | B2 | 2/2008 | Hack |
| 7,356,665 | B2 | 4/2008 | Rawson |
| 7,363,463 | B2 | 4/2008 | Sheu et al. |
| 7,395,405 | B2 | 7/2008 | Anderson et al. |
| 7,434,003 | B2 | 10/2008 | Oney et al. |
| 7,529,906 | B2 | 5/2009 | Sheets |
| 7,552,426 | B2 | 6/2009 | Traut |
| 2002/0083110 | A1 | 6/2002 | Kozuch et al. |
| 2003/0037089 | A1 | 2/2003 | Cota-Robles et al. |
| 2003/0172305 | A1 | 9/2003 | Miwa |
| 2004/0128670 | A1 | 7/2004 | Robinson et al. |
| 2005/0044301 | A1 | 2/2005 | Vasilevsky et al. |
| 2005/0080934 | A1 | 4/2005 | Cota-Robles et al. |
| 2006/0005190 | A1 | 1/2006 | Vega et al. |
| 2006/0112212 | A1 | 5/2006 | Hildner |
| 2006/0259732 | A1 | 11/2006 | Traut et al. |
| 2007/0006227 | A1 | 1/2007 | Kinney et al. |
| 2007/0011444 | A1 | 1/2007 | Grobman et al. |
| 2007/0112999 | A1 | 5/2007 | Oney et al. |
| 2008/0134174 | A1 | 6/2008 | Sheu et al. |

FOREIGN PATENT DOCUMENTS

| | | | |
|---|---|---|---|
| WO | WO 03/090070 A2 | 10/2003 | |

OTHER PUBLICATIONS

Eranian, S. et al., "Virtual Memory in the IA-64 Linux Kernel," Prentice Hall PTR, www.phptr.com/articles/article.asp?p+29961&seqNum+4&rl+1, Nov. 8, 2002, downloaded Aug. 31, 2006, 46 pages.

King, S. et al., "Operating System Support for Virtual Machines," Proceedings of the 2003 USENIX Technical Conference, http://www.eecs.umich.edu/virtual papers/king03.pdf, 2003, 14 pages.

LeVasseur, J. et al., "Pre-Virtualization: Slashing the Cost of Virtualization," Nat'l ICT Australia, 2005, 1-14.

Rosenburg, B.S., "Low-Synchronization Translation Lookaside Buffer Consistency in Large-Scale Shared-Memory Multiprocessors," ACM, http://www.logos.t.u-tokyo.ac.jp/~tau/os-lecture/articles/p137-rosenburg.pdf#search=%22Translation-lookaside%20buffer%20consistency%22, 1989, 137-146.

Taylor, G. et al., "The TLB Slice—A Low-Cost High-Speed Address Translation Mechanism," IEEE, http://delivery.acm.org/10.1145/330000/325161/p355-taylor/pdf?key1=325161&key2=8514904611&coll=GUIDE&dl=GUIDE&CFID=4997640&CFTOKEN=80512607, 1990, 355-363.

Uhlig, V. et al., "Towards Scalable Multiprocessor Virtual Machines," Proceedings of the 3rd Virtual Machine Research & Technology Symposium, San Jose, CA, http://14ka.org/publications/2004/Towards-Scalable-Mutliprocessor-Virtual-Machines-VM04.pdf, May 6-7, 2004, 1-14.

VMware, Inc., "vmi_spec: Paravirtualization API Version 2.0," www.vmware.com/pdf/vmi_cpecs.pdf, 2006, 1-35.

Barham, et al., "Xen and the Art of Virtualization", 2003, ACM Press, Proceedings of the 19th ACM Symposium on Operating Systems Principles, 164-177.

* cited by examiner

Virtual Address 190

METHOD AND SYSTEM FOR CACHING ADDRESS TRANSLATIONS FROM MULTIPLE ADDRESS SPACES IN VIRTUAL MACHINES

CROSS-REFERENCE TO RELATED APPLICATIONS

This application is a continuation of and claims priority to U.S. patent application Ser. No. 11/128,982, filed May 13, 2005, entitled "Method and System for Caching Address Translations From Multiple Address Spaces in Virtual Machines" which is incorporated herein by reference in its entirety.

FIELD OF THE INVENTION

The invention relates to the field of computer programming. More specifically, the invention relates to virtualization of guest memory in a virtual machine environment through an efficient cache of address translations from multiple guest address spaces.

BACKGROUND OF THE INVENTION

Virtual machine technology allows multiple virtual machines, each having their own operating system, to run on a single physical machine. The virtual machine is called a guest with respect to the host computer. The host computer has virtualization software that emulates the processor architecture and the hardware resources required by the software running inside a virtual machine. The virtualization software emulates the instructions executed by the guest and virtualizes the hardware resources of the host machine for use by the guest.

With virtual machine technology, the guest computer system exists on the host computer system as a pure software representation of the operation of the hardware architecture of the virtual machine. The virtualization software executing on the hardware architecture of the host computer mimics the operation of the entire guest computer system. The virtualization software acts as the interface between the hardware architecture and resources of the physical machine and the instructions executed by the software (e.g., operating systems, applications, etc.) running in the virtual machine environment. In one embodiment of virtual machine technology, the virtualized environment is created by a Virtual Machine Monitor (VMM), which is a software layer that runs directly on top of the host hardware but below the guest software and may run side-by-side and work in conjunction with a host operating system. The VMM can virtualize the resources of the host machine by exposing interfaces that match the guest's hardware architecture and by intercepting and virtualizing operations performed by the guest. This virtualization enables the virtualization software (and the host computer system) to go unnoticed by the guest operating system running on top of it, although this virtualization does incur a performance penalty as it consumes host resources (e.g., the processor). In addition, it is desirable to keep one virtual machine separated from other virtual machines, as well as from the host. Separation of one virtual machine from another is useful to isolate faults such that a fault in one virtual machine does not affect another virtual machine.

Computer operating systems typically provide isolation between different applications so that when one application fails, others are not affected. One technique is to execute each application in a separate process with its own address space. With this mechanism, each process is presented with virtual memory addresses that it can read from or write to, and the operating system takes care of backing the pages of virtual memory used by the application with pages of physical memory and maintaining a map of virtual addresses (VAs) to physical addresses (PAs). Since a process can only access memory via virtual addresses, the operating system is able to restrict the pages of physical memory that a process may access. When a program accesses a virtual memory address, the processor translates the virtual address into a physical address by consulting the VA-to-PA map specified by the operating system.

One processor architecture that may be used in the host computer system is the x86 family of processors. Modern x86 processors have a built-in memory address map lookup mechanism that efficiently converts a virtual address to a physical address via a procedure known as a page table walk. Page tables specify a VA-to-PA map, which the operating system maintains for each virtual address space. FIG. 1 shows a typical prior-art page table walk process, implemented in hardware in an x86 processor.

An x86 processor with paging enabled relies on a set of page directory tables (PDTs) that point to page tables (PTs) to map virtual addresses to physical addresses. Most modern x86 processors also support Physical Address Extension (PAE), which increases the amount of physical memory the machine can support. With PAE enabled, a third-level address translation lookup table called the page directory pointer table (PDPT) is also used. Finally, x86 processors with 64-bit extensions require a fourth-level address translation lookup table called a page map level 4 table (PML4T). In all of these variations, the approach is the same: each upper-level page table references one or more page tables for the next level. Each tree of page tables specifies a sparse map of the virtual address space.

FIG. 1 represents a standard x86 scheme 100 for resolving a virtual address 190 to a physical address. A processor control register 110 specifies the physical address 115 of the page directory pointer table (PDPT). In the example of an x86 processor, the control register is known as CR3. The top bits 192 of the virtual address provide an index 125 into the PDPT to select from a multiplicity of page directory tables (PDTs) 130, 140. In the FIG. 1 example, the VA selects the PDT 140, which points to a multiplicity of page tables 160, 170. The middle bits 194 in the VA indexes 145 into the PDT to select a page table 170. A specific entry 180 in the selected page table 170 is selected by another field of bits 196 in the VA. The entry 180 is the physical address corresponding to the virtual address 190 being resolved, with the bottom bits 198 specifying the offset into the page. In summary, the x86 processor resolves a virtual address by walking down the page table tree starting at the top-level page table specified in the control register (CR3) and indexing into each page table using parts of the VA. The selected entry in the leaf page table stores the related physical address.

Modern x86 processors also feature a translation lookaside buffer (TLB) in which it caches the most recently traversed page table mappings, by storing pairs of virtual addresses and physical addresses. Upon a memory access, the processor checks if the desired VA-to-PA translation is already cached in the TLB. If it is, the TLB hit allows the processor to skip the page table walk of FIG. 1, resulting in higher performance because of the lower address translation latency. If the translation is not cached, the TLB miss requires a higher expense walk of the page tables. The x86 architecture dictates the semantics for keeping the TLB, which is a non-coherent cache of the page tables, synchronized with the page tables, when the operating system makes modifications to them. A page table modification is only effective after the operating system invalidates the affected VAs using the INV-LPG instruction or flushes the TLB of all stale VA-to-PA translations by modifying the control register (CR3). In the x86 architecture, writing to CR3 not only changes the base of the page table tree used for address translations but also flushes the TLB of stale translations to achieve synchronization to the page tables. Many processors indiscriminately flush the entire TLB on a write to CR3. However, processors with a tagged TLB associate each translation with a particular address space (a tag) and snoop the bus for memory writes to detect translations that become stale due to page table modifications, so they can retain translations across address space switches by removing only the stale translations.

To isolate virtual machines, the virtualization software allocates separate portions of host memory to different virtual machines. However, this requires the physical addresses of the guest to be virtualized, so that while a guest may think a page of memory is at a certain physical address, that page actually resides at a different physical address in the host memory system. An address into what the guest thinks is physical memory is called a guest physical address (GPA), and an address into the host's physical memory is called a system physical address (SPA). Typically, GPAs do not correspond to SPAs. Therefore, the virtualization software must enforce an additional translation from GPA to SPA, while preserving the translation from VA to GPA enforced by the guest operating system. Consequently, the guest page tables cannot be directly traversed by the x86 processor's address translation hardware, because they map VAs to GPAs, not to SPAs. On every memory access, an unoptimized VMM must manually walk the guest page tables to translate the VA to a GPA (losing the benefit of the page table walking hardware), and then translate the GPA into an SPA using its internal tables.

To improve the efficiency of memory virtualization, an optimized VMM may take the result of the VA-to-SPA translation it performs and cache it in a format that can be efficiently accessed in the future. One solution is for the VMM to maintain shadow page tables (SPTs) that map guest VAs to SPAs and are walked by the processor when resolving VAs. That way, when a VA cached in the SPTs is accessed, the page table walk hardware can use the SPTs to directly translate the VA into an SPA, thus allowing the guest to access memory without any intervention by the VMM. When the VA is not cached, the processor's address translation hardware generates a page fault, which the VMM receives and must service by walking the guest page tables and creating a VA-to-SPA translation in the SPTs. This VMM intervention is very expensive in terms of machine cycles. Although the hardware page table walk shown in FIG. 1 may take ten to a few hundred machine cycles, the VMM intervention may take several thousands of machine cycles, which is up to two orders of magnitude more costly.

VA-to-SPA translations cached in the SPTs are almost analogous to VA-to-PA translations cached in a TLB of a physical processor, because those VAs can be resolved without the VMM looking at the page tables. Therefore, the SPTs effectively form a virtual TLB with respect to the guest. This virtual TLB preferably has the same behavior as a physical TLB, so it preferably flushes all stale translations whenever the guest modifies the control register 110 in FIG. 1, which occurs whenever the operating system switches between two processes (hence, between two different address spaces with their own page table tree). On many processors, the hardware TLB flushes all translations indiscriminately, and the analogous operation for the virtual TLB would be to flush all entries in the SPTs. However, the cost of repopulating a VA-to-SPA entry in the virtual TLB is up to two orders of magnitude greater than the cost of repopulating a VA-to-PA entry in a physical TLB, and the virtual TLB is much larger than a physical TLB, so the impact of indiscriminately flushing all entries in the virtual TLB, instead of flushing only the stale entries, is significantly higher. Most operating systems frequently switch between address spaces and consequently flush the TLB frequently. The impact of flushing the TLB on a physical machine is small, but in a virtual machine environment, a large percentage of host processor cycles may be spent re-populating the virtual TLB as a result of TLB flushes by the guest operating system.

Thus, there is a need for a method and system to implement a highly efficient translation from a virtual address to a system physical address in a virtual machine environment. It would be advantageous to implement a virtual TLB that retained as many cached address translations as possible across both address space switches and indiscriminate flushes of the entire TLB by the guest, in a manner that preserves the TLB semantics of existing processor architectures. Accordingly, the virtualization software may efficiently support existing operating systems for those architectures without requiring changes to those operating systems. In addition, such a virtual TLB is preferably not be too expensive in terms of computer resources such as memory size or processor cycles, and for this technique to be worth the added complexity. Accordingly, the virtual TLB is preferably more efficient than a simple virtual TLB that flushes all translations on an address space switch. The present invention addresses the aforementioned needs and solves them with additional advantages as expressed herein.

SUMMARY OF THE INVENTION

Aspects of the invention solve the problems associated with simultaneously shadowing multiple address spaces to retain mappings across address space switches while preserving the TLB semantics of processor architectures such as x86. Embodiments of the invention implement methods and a system to efficiently cache translations from multiple guest address spaces in corresponding shadow address spaces and remove only the cached translations that are stale upon an address space switch or an indiscriminate flush of the TLB by the guest. The challenge in removing stale translations is how to detect when the guest page tables are modified. Once a guest page table has been modified, the translations in the shadow page tables are stale since they no longer reflect the corresponding VA-to-GPA map that they cache, and all stale translations are removed on the next write to CR3 to maintain the TLB semantics of architectures such as x86 and, in turn, allow the existing operating systems to run unmodified in the virtual machine environment. Once the guest page table modification is detected by the VMM, it no longer needs to be notified about subsequent modifications of that guest page table until at least after the next write to CR3.

One aspect of the invention requires efficiently implementing a software version of a tagged TLB to cache translations from multiple address spaces in a virtual machine. An efficient virtual TLB may be provided by selectively removing only the stale VA-to-SPA translations, instead of flushing the entire virtual TLB, upon an address space switch or an indiscriminate flush of the TLB. Stale translations can be detected by intercepting the creation of guest-writable mappings to guest page tables with translations cached in shadow page tables. The virtual TLB is able to intercept the creation of guest-writable mappings, because the guest cannot access a page without the VMM creating a VA-to-SPA translation in the SPTs for that page. A guest-writable mapping to a guest page at a particular GPA is a VA-to-SPA translation with a writable attribute in which the GPA corresponds to that SPA. Upon intercepting at least one write to a guest page, the VMM creates a guest-writable mapping to disable subsequent write intercepts on that guest page, to reduce the cost of making multiple writes to that guest page. Since guest-writable mappings enable changes to the guest page that is mapped without any intervention by the VMM, when a guest page table becomes guest-writable, the corresponding SPT entries are assumed to be stale and are purged upon a switch to a new address space. Thus, the software version of a tagged TLB can efficiently detect when translations become stale, and remove those transactions but retain non-stale translations upon an address space switch or an indiscriminate flush of the TLB by the guest.

In another aspect of the invention, the VMM efficiently write-protects guest page tables by tracking guest-writable mappings to every guest page table and removing those mappings. However, the CPU and memory cost of tracking guest-writable mappings to all guest pages is prohibitive, so the VMM tracks only the guest pages that have been or are likely to be used as a guest page table and this set of tracked shadowed guest pages grows incrementally and is built dynamically based on the guest page tables walked in resolving address translations. The cost of write-protecting untracked shadowed guest page tables is also prohibitive, so instead, the VMM assumes those tables are a priori guest-writable, marks translations cached from those tables as stale, and defers write-protecting them until the number of times that untracked guest page tables are shadowed exceed a threshold, at which point all cached translations in the virtual TLB are purged to write-protect all guest pages (as they are encountered) and the tracking of guest-writable mappings to those tables begins. When deferring the write-protection of untracked guest page tables, the VMM adds those guest pages to a list of guest pages that are candidates for being tracked. Purging all cached translations promotes the guest pages on the candidate list to tracked guest pages.

In another aspect of the invention, shadow page tables may be shared between shadow address spaces if the corresponding guest page tables are used by multiple guest address spaces. In such an instance, each shadow page table may be tagged with the corresponding guest page directory table attributes and processor control register flags to preserve the access permissions. This technique optimizes the shadowing of guest page tables shared between address spaces, which is common in modern operating systems. In another embodiment, shadow page tables may be shared between virtual processors, thereby allowing each processor to use translations cached by other processors, reducing the memory overhead of SPTs, and having only one set of SPTs to update when removing stale translations and handling invalidations of specific virtual addresses. In another embodiment, the SPTs may be placed on a purge list when they become unreferenced when a shadow address space is reclaimed, so when the corresponding GPTs are shadowed again, the VMM can link those SPTs back into a shadow address space, bringing back in the translations cached on those SPTs. In another embodiment, the VMM randomly prunes the hash table, usually of fixed size, used to track information on a sparse subset of guest pages, such as any guest-writable mappings to them, in order to make pre-existing space for new entries and prune older data, with the hash table reaching a relatively stable state at some point. This opportunistic maintenance of the hash table allows time-critical paths to avoid the cost of having to evict existing entries.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
FIG. 1 is a block diagram of a prior-art scheme of determining a physical address from a virtual address by walking a tree of page tables specified by the operating system.
Figure 1:
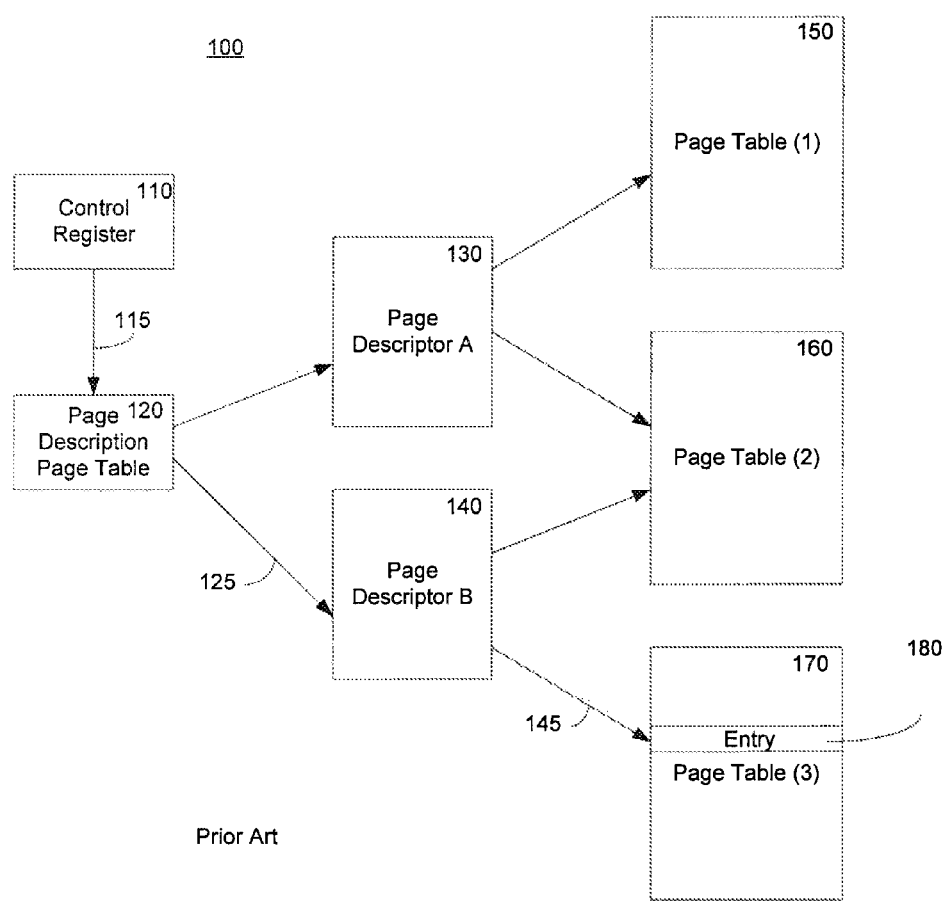

In one virtual machine implementation, the Virtual Machine Monitor (VMM) implements a set of shadow page tables (SPTS) that caches address translations in the guest page tables maintained by the guest operating system. The guest page tables (GPTs) map virtual addresses (VAs) to guest physical addresses (GPAs), but the VMM makes a second-level translation from GPAs to system physical addresses (SPAs). The SPTs cache processor traversable VA-to-SPA translations based on the two different sets of mappings, VA-to-GPA specified by the guest and GPA-to-SPA enforced by the VMM. The SPTs initially do not cache any translations but they build up their cache of translations on demand as the guest accesses memory. When the guest accesses a VA for the first time, the processor generates a page fault and traps into the VMM, because the SPTs have no valid entries for that VA. The VMM page fault handler walks the GPTs related to that VA and reads the VA-to-GPA translation. If the GPT entry is invalid, the VMM reflects a page fault exception to the guest. Otherwise, the VMM translates the GPA to an SPA and updates the SPTs to reflect that VA-to-SPA translation. When the VA-to-GPA map changes as a result of a modification to the guest page tables, the corresponding VA-to-SPA translation cached in the SPTs becomes stale. The VMM retains control of the page tables used by the physical processor by setting the control register that specifies the base of the page table tree to one of its SPTs. When the guest attempts to set that control register to one of its GPTs, the VMM intercepts and virtualizes this operation.

The shadow page tables effectively form a virtual translation look-aside buffer (TLB), since memory accesses to virtual addresses cached in the SPTs can bypass the VMM's software walk of the guest page tables. However, the software process to introduce a new VA-to-SPA address translation into the virtual TLB is up to two orders of magnitude more expensive than a hardware TLB miss. Consequently, virtual TLB misses account for a substantial portion of the performance overhead of a VMM that does not utilize the method described herein for caching translations from multiple address spaces. Minimizing the cost of memory virtualization using shadow page tables requires reducing the virtual TLB miss frequency.

To reduce the cost of memory virtualization, the virtual TLB ideally caches more translations than a physical TLB and it retains those translations as long as possible. In one aspect of the invention, a solution to achieve efficient memory virtualization and substantially improve performance in a virtual machine environment is to implement a virtual TLB that retains translations from multiple address spaces across both address space switches and indiscriminate flushes of the TLB by the guest, thus minimizing the number of cached translations discarded unnecessarily. This may be accomplished with the careful use of shadow page tables and the introduction of a multiplicity of shadow address spaces in the VMM.

The hardware translation look-aside buffer (TLB) in a physical processor is analogous to the shadow page tables in the VMM, because it caches translations from VAs to PAs to avoid an address translation process having to walk the page tables on every memory access. When the accessed VA is not cached in the TLB, a TLB miss occurs and the processor walks the page tables starting from the base of the page table tree specified by the operating system (or the VMM). Since the TLB is defined by the processor architecture as a non-coherent cache of the page tables, the operating system is responsible for notifying the processor of changes to the VA-to-GPA map to synchronize stale translations to the page tables; one implementation is to remove the stale translations from the TLB. Many processor architectures provide hardware instructions to invalidate cached translations at a few granularities, such as invalidating a single translation and invalidating all translations. Many x86 processors invalidate all (non-global) cached entries when the operating system switches between processes by modifying the control register (CR3) that specifies a pointer to the base of the page table tree. In the x86 processor architecture, a write to CR3 is accomplished using the MOV CR3 instruction.

Likewise, the VMM virtualizes the processor architecture's instructions for invalidating page table entries and update the shadow page tables (SPTs) accordingly to remove the stale translations upon an address space switch, since the shadow page tables effectively form a software virtual TLB and are thus a non-coherent cache of the guest page tables. However, the VMM should avoid needlessly invalidating all of the translations cached in the SPTs, because otherwise, it incurs the significant cost of rebuilding that cache by taking VMM page faults on memory accesses by the guest. This means that an efficient virtual TLB cannot use the simple approach of discarding all cached translations whenever the guest switches address spaces.

One approach for multiple address space shadowing at a high level may be introduced by describing what an equivalent hardware solution would do before a similar but more complex solution for software is described. Some x86 processors implement a tagged TLB that caches translations from multiple address spaces. In such processors, the TLB is enhanced with tag bits. These bits are associated with every TLB entry, and only the entries whose tag matches the current tag register would be used to resolve VA-to-PA mappings. It is possible to use the base of the page table tree (CR3) value as the tag, but this would be an expensive hardware undertaking. The bits used to represent a tag can be reduced (e.g., three bits can represent up to eight address spaces) if a small content-addressable memory is used to track recent CR3 values. The tagged bits enable the TLB to distinguish translations from different address spaces and to lookup only the translations for the current address space.

With tagged TLBs, upon a MOV CR3 instruction, the x86 processor modifies the current tag register set to the tag corresponding to the new CR3, and the TLB will then resolve VA-to-PA mappings with the new tag. New entries introduced by a TLB miss resolution are tagged with the current tag value. The net result is that the impact of MOV CR3, which typically invalidates all (non-global) TLB entries on processors without tagged TLB, is reduced since any entries associated with the previous CR3 are not flushed.

To maintain the semantics of a TLB flush, the tagged TLB remains synchronized with the corresponding page table entries at certain state changes. The x86 architecture provides the INVLPG instruction to explicitly invalidate a specific VA-to-PA mapping in the TLB, but the semantics of MOV CR3 implies flushing all (non-global) TLB entries in addition to switching address spaces. The tagged TLB scheme invalidates the specified VA in response to an INVLPG instruction. It also performs invalidations implied by MOV CR3 in response to modifications to both active and inactive page tables. The TLB entries are synchronized to the page tables upon a MOV CR3, meaning that any stale translations are removed.

To detect page table modifications, a second physical address TLB (PA-TLB) may be created to track the PAs of the page tables used to form the VA-to-PA mappings in the TLB. Whenever a TLB miss causes a successful page table walk, an entry is created in the PA-TLB to track the PA of the page table entry itself as well as a reference to the new TLB entry. Physical addresses from all processors are then snooped on the bus. When the physical address of a memory write matches a PA in the PA-TLB, the TLB entries corresponding to the modified VA-to-PA mapping are invalidated as they may have become stale. Any entries evicted from the PA-TLB also require the corresponding TLB entries to be removed, since evicting the PA-TLB entries prevents the processor from monitoring the corresponding page table entries for changes.

Consequently, a hardware solution would maintain TLB entries associated with multiple address spaces. Since MOV CR3 implies a TLB flush, the hardware would have to intercept page table modifications and invalidate TLB entries that become stale as a result. However, the write snooping on the bus allows the hardware to immediately detect and invalidate stale translations. Under this scheme, MOV CR3 no longer implies synchronizing the TLB because stale TLB entries have already been purged.

A hardware implementation of tagged TLBs has the advantage of being able to snoop on the bus for writes from all processors and perform lookups in parallel. An analogous software implementation would write-protect all mappings to shadowed page tables, but this is much more expensive. To cache multiple address spaces, the VMM maintains multiple SPT trees each of which is associated with a tag. Each of these SPT trees is called a shadow address space (SAS). Only the SPT tree whose tag matches the current tag is used to resolve VA-to-SPA translations. As with the hardware solution, the tag could be only a few bits and a lookup table is used to map recent CR3 values to a tag. Upon a MOV CR3 by the guest, the physical CR3 is set to point to the SPT tree corresponding to the new tag. Page faults and INVLPG instructions would affect entries in the current SPT tree. This scheme enables the VMM to preserve VA-to-SPA mappings across CR3 modifications.

However, as with the hardware TLB, this multiple address space shadowing scheme preferably honors the TLB flush implied by MOV CR3 and synchronizes the SPT entries with the corresponding guest page table entries. To detect stale cached translations, the VMM intercepts all guest page table modifications. Since the guest cannot edit a guest page table before the VMM creates a VA-to-SPA translation to that GPT, the VMM can detect the creation of such mappings when handling page faults and it can create a write-prohibited mapping.

The VMM maintains a hash table that is analogous to the hardware solution's PA-TLB for tracking the guest pages that contain shadowed guest page tables. When servicing a page fault, the VMM checks the hash table to determine whether the guest page being accessed, and subsequently about to be mapped, contains a guest page table. If that is the case, the corresponding SPT is marked for flushing upon the next MOV CR3 since the GPT is now guest-writable and the SPT entries may become stale. In essence, upon a MOV CR3, the VMM flushes the SPT of any guest page table that is both guest-writable and shadowed to ensure that the virtual TLB does not cache any stale translations when the MOV CR3 virtualization completes.

However, a serious complication is that the guest page containing the guest page table may have been mapped before it is shadowed by the VMM. To address this problem, the VMM records for each guest page whether that page is mapped in the SPTs. Stated another way, the VM records for each page whether the page is guest-writable. A guest-writable page is a page that a guest has unconstrained access to change without the VMM being aware of the change. Before it shadows any guest page table, the VMM checks to see whether that guest page is mapped. If that is the case, the VMM either modifies any mappings to that guest page so the guest cannot modify the page without the VMM intercepting it, or it marks the SPT to be flushed upon the next MOV CR3 since it may have stale entries due to existing guest-writable mappings. The VMM tracks the guest-writable mappings to each guest page that is used as a GPT, so it can efficiently write-protect the GPT by removing those mappings.

This solution satisfies the implied TLB synchronization that occurs whenever the guest executes a MOV CR3 instruction. The key invariant is that any guest page table that is ever simultaneously guest-writable and shadowed will have any corresponding SPTs flushed upon the next MOV CR3. The solution in software is much more complicated, because hardware can be more fine-grained by snooping for memory writes on bus, whereas software can only intercept the creation of guest-writable mappings to shadowed guest page tables.

Exemplary Embodiments of the Invention

Figure 2:
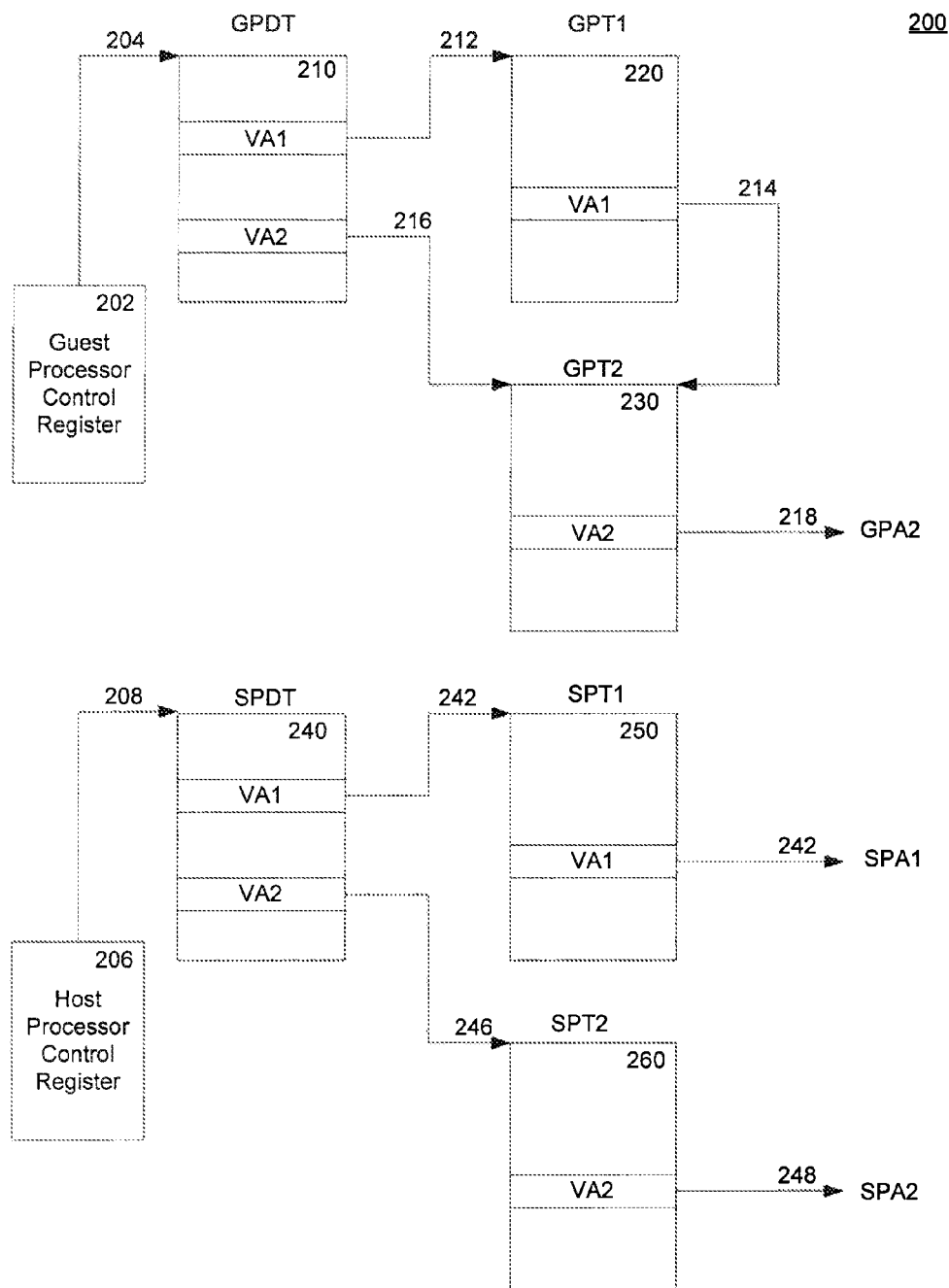
FIG. 2 is an example of guest page tables and shadow page tables in a virtual machine environment according to the invention.

FIG. 2 is an example of a set 200 of guest page tables and corresponding shadow page tables according to the present invention. A hardware processor control register 202, such as an x86 family CR3 register, may be loaded with a physical address 204 to a guest page directory table (GPDT) 210. The GPDT 210 entry for a given virtual address, for example VA2, provides a reference 216 to a guest page table (GPT2) which provides a reference 218 to the corresponding guest physical address GPA2. The VMM obtains the address GPA2 from walking the GPTs and translates it into a system physical address SPA2. As an aspect of the present invention, a subset of the guest page table entries are reflected in the shadow page tables. Shadow page directory table 240 (SPDT) is a shadow copy of GPDT 210. Shadow page table 1 (SPT1) 250 is a shadow copy of GPT1 220 and shadow page table 2 (SPT2) 260 is a shadow copy of GPT2 230. The shadow page table entries are such that a virtual address VA2 in GPDT 210 corresponding to GPA2 218 in GPT2 230 is shadowed by VA2 in SPDT 240 corresponding to SPA2 248 in SPT2 260.

Coherency issues arise if an edit in the guest page tables changes the mapping of a virtual address to a different GPA or modifies any attribute in the guest page table. For example, if the mapping of VA1 in GPT 1 220 is edited such that VA1 is translated to GPA2, then the VA1-to-SPA1 translation cached in the shadow page table 250 no longer reflects the VP-to-GPA translation in GPT1 220. Cached translations that are stale such as the VA1-to-SPA1 translation should be purged from the shadow page tables when the guest performs an operation, which in the emulated architecture, requires a flush of all stale translations. But, since the VA2-to-SPA2 translation in the SPT2 still corresponds to the VA2-to-GPA2 translation in GPT2, that SPT entry can be retained.

In one aspect of the invention, address translations cached in shadow page tables are maintained so that they remain consistent with the corresponding shadowed guest page tables to the extent that is necessary in order to maintain proper execution of the virtual machine's instructions, as dictated by the processor architecture. Address translations are cached for multiple address spaces, and are maintained in such a way that as many cached translations as possible are retained across certain guest processor events that require certain stale translations to be removed from the shadow page tables.

A "shadowed" guest page table is a GPT that has one or more of its translations cached in some SPT. A page of guest memory is "mapped" if there is at least one entry in an SPT corresponding to that page. When a guest page is mapped, the guest can access that page without the VMM intercepting the access, because the hardware page table walker is able to locate the page of memory using the VA-to-SPA translation in the SPTs. In the x86 processor architecture, page tables are stored in pages of physical memory, and likewise in a virtual machine, guest page tables are stored in pages of guest physical memory. Therefore, it is possible for a page of guest physical memory containing a guest page table to be both shadowed and mapped at the same time. This case gives rise to the cache coherency issues, because it allows the guest to make changes to that guest page table without the VMM being notified, but the VMM still needs to maintain consistency between each SPT and the GPT it shadows.

In one aspect of the invention, the manner in which SPTs cache address translations corresponding to the translations found in guest page tables on a virtual machine is analogous to the manner in which a TLB caches address translations found in page tables on a physical machine. As such, in order to maintain correct operation of a virtual machine, the validity of the translations in the SPTs with respect to the contents of the guest page tables on a virtual machine are subject to the same requirements as is the validity of the translations in the TLB with respect to the page tables on a physical machine.

On a physical machine, in some processor architectures including x86, cached translations in a TLB are permitted to be stale with respect to the address translations that appear in the page tables for a period of time after the page tables are modified. Translations in the TLB become synchronized with the translations in the page tables again after an address space switch, which occurs when the operating system writes to CR3. In one embodiment, the VMM maintains correct behavior by purging stale mappings from the SPTs when the guest operating system loads a value into the virtual processor's CR3.

In one aspect of the invention, the VMM maintains multiple shadow address spaces, which include a tree of shadow page tables. Each shadow address space corresponds to an address space within the guest. The SPTs of each shadow address space cache translations from the guest page tables of the corresponding guest address space.

The guest creates a mapping in its page tables in order to edit one of its own guest page tables. The VMM can detect when a corresponding VA-to-SPA mapping to the guest page table is created in the SPTs when handling a page fault. Although the VMM cannot directly intercept individual writes to guest page tables by way of physical address snooping, as a tagged TLB in hardware can, it can intercept the creation of a guest-writable mapping that would permit the guest to make such modifications without trapping into the VMM. As guests may edit many entries in a guest page table at a time, after one or more write intercepts, the VMM chooses to create a guest-writable mapping at that VA to prevent further intercepts until the next time the guest page table is shadowed, at which point the write intercepts could be re-enabled by removing those guest-writable mappings. The VMM keeps track of which guest pages contain guest page tables that are currently shadowed. Upon a page fault, the VMM checks to see if the guest page being mapped in is also currently shadowed. If so, the SPT shadowing the GPT being mapped in is marked as stale and purged upon the next address space switch, since the GPT page is now guest-writable and the SPT entries may no longer reflect the translations in the GPT. This sequence of events is referred to as shadow-then-map.

However, a complication is that a guest page containing a guest page table may have guest-writable mappings before it is shadowed by a SPT in the VMM. This is problematic, because the guest can use the existing guest-writable mapping to modify the guest page table, causing the entries in the SPT to become stale. This sequence of events is referred to as map-then-shadow. To address this occurrence, before the VMM shadows a guest page table, the VMM prohibits undetected writes to the guest page table by removing all guest-writable mappings to that page in the SPTs (so the guest cannot modify the page undetected by the VMM) or immediately marks all translations in the SPT as stale. By write-protecting the guest page tables, the VMM can trap and thus detect any attempted change which alerts the VMM to potential stale translations in the SPTs. The alternative to write-protecting the GPT is to assume that the SPT has stale translations, but this means those translations will be lost on the next address space switch or indiscriminate flush of the TLB.

The VMM purges the SPT corresponding to any guest page table that may contain stale entries when switching to a shadow address space (SAS). This action ensures that the SPTs are synchronized to the guest page tables by the time the switch to a new SAS completes. Therefore, the VMM page fault handler detects two conditions that result in SPTs with stale entries: shadow-then-map and map-then-shadow. In shadow-then-map, the VMM detects that the page being mapped in is a shadowed GPT. In map-then-shadow, the VMM detects that guest-writable mappings to the GPT being shadowed exist in the SPTs. Upon an address space switch, the VMM may then selectively purge the SPTs marked stale of invalid address translations so that all of the remaining VA-to-SPA address translations in the virtual TLB are accurate. This solution satisfies the implied TLB synchronization that may be required upon an address space switch.

In another aspect of the invention, guest-writable mappings to specific pages may be efficiently removed in the course of write-protecting a guest page. In this aspect of the invention, the guest-writable mappings are tracked to only a specific but evolving subset of guest pages. Over time, a working set of the guest pages that are of interest (i.e., have been or will likely be used as a guest page table) will be built up in the VMM.

The VMM removes all of the guest-writable mappings to a given page before shadowing a guest page table. This allows the VMM to avoid marking the SPT as stale due to the possibility that the guest might be able to modify that GPT through an existing guest mapping unknown to the VMM as shown and described in FIG. 2 as the VA1-to-SPA1 translation, which allows the guest to modify GPT2 undetected by the VMM. Thus, a stale SPT is one that may no longer accurately reflect the translations in the corresponding guest page table. However, tracking the guest-writable mappings to every guest page is infeasible due to the substantial amount of memory and CPU time needed to interrogate or maintain the database of guest-writable mappings. This scheme would involve keeping multiple back references from every guest page to the guest-writable VA-to-SPA mapping to that guest page, which could be up to one million pages for 4 GB of 4 KB pages. The fact that only a small subset of guest pages is actually of interest to the virtual TLB motivates a novel approach to solving this problem.

The VMM watches for guest-writable mappings only to pages that have previously been shadowed since such guest pages are likely to be used as a guest page table. When it first shadows a guest page table, it inserts that page into a hash table indexed by GPA. When creating a guest-writable mapping to a page, the VMM checks whether that guest page is in the hash table. If it is, the VMM records in the hash table a back reference from that guest page to the SPT entry mapping the guest page in. This enables the VMM to quickly find and write-protect all guest-writable mappings to any given page tracked by the hash table.

A complication arises when a page with a GPT is shadowed for the first time, since the VMM has not been watching for guest-writable mappings to that page. The VMM inserts the page into the hash table so that any new mappings will be recorded, but it does not know what guest-writable mappings to the page already exist. It is too costly to scan all SPT entries for such mappings to make this determination. Instead, it assumes that the page may have guest-writable mappings to it that are unknown to the VMM, and it also records in the hash table that the page should be tracked moving forward. Any shadow pages tables corresponding to that GPT will be considered stale. Periodically, the VMM purges some or all guest mappings in the SPTs so that all pages tracked in the hash table have known guest-writable mappings, since there will be no guest mappings after the full-purge of the virtual TLB.

Using this approach, the VMM will build up a working set of GPT pages in the hash table, at which point it will be tracking guest mappings to most or all shadowed GPTs. Data and simulations of many workloads indicated that the set of pages with GPTs, though evolving, is relatively stable in steady state, with typically at most a few pages per second becoming GPTs. This ensures that the VMM will not need to perform a full purge of all cached translations very frequently. The VMM performs a full-purge of the virtual TLB only when the number of times an untracked GPT is shadowed exceeds a certain threshold.

Overall, the present invention may be considered optimized based on several assumptions concerning the overall process. Those assumptions include the idea that the vast majority of memory accesses originate from a small number of address spaces. Next, the set of guest pages used as page tables is fairly stable in steady state, and the number of guest page tables is much smaller than the number of guest pages. Additionally, the guest page tables may be frequently modified by the guest.

As part of the embodiment, the VMM maintains metadata on each shadow page table, including which GPT page it shadows, whether it has stale mappings, and which SPDT entries point to the SPT. An SPT becomes stale if the corresponding guest page table page becomes guest-writable, and the VMM updates the SPT metadata accordingly.

Figure 3:
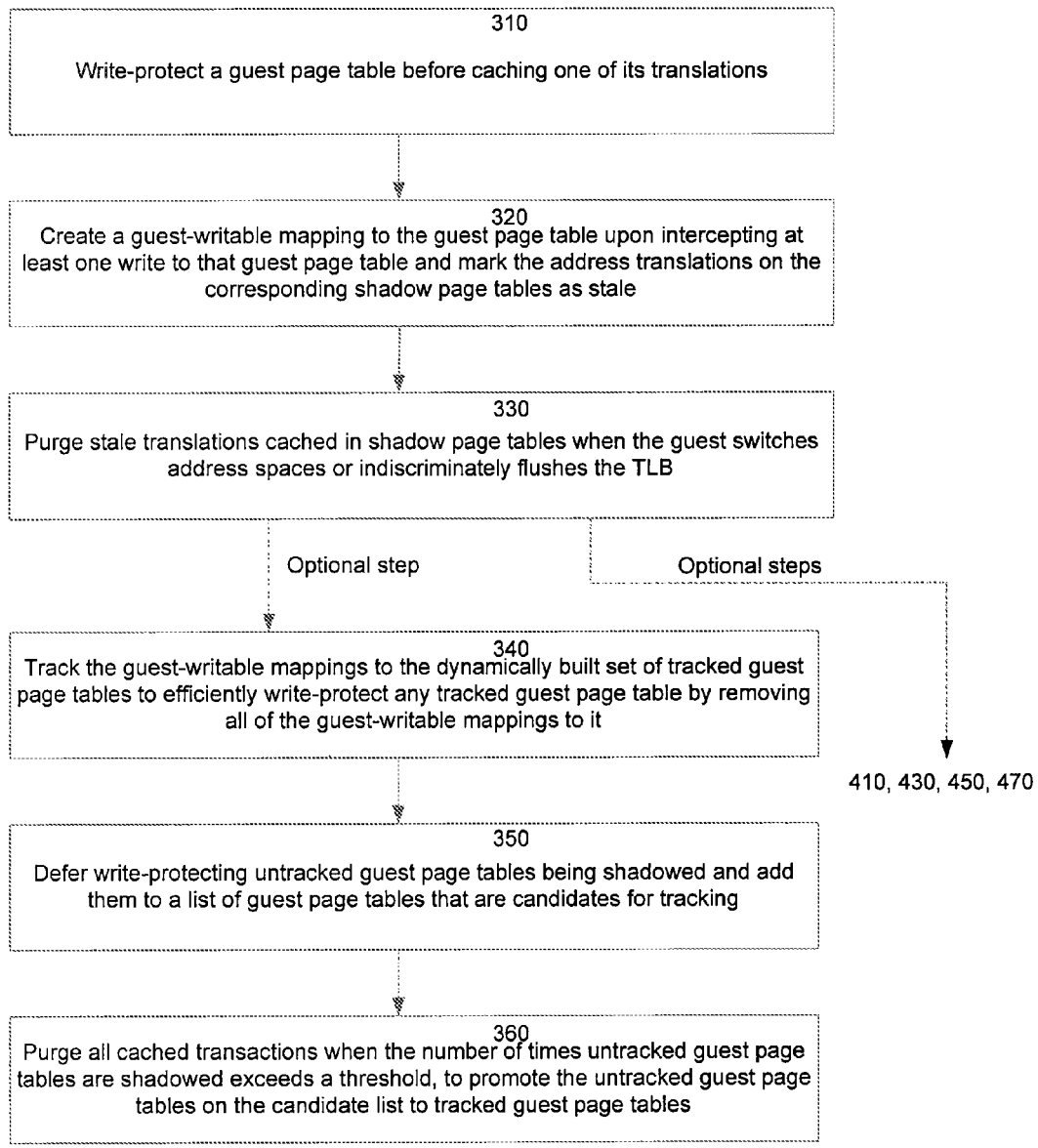
FIG. 3 is an exemplary method to efficiently maintain multiple shadow address spaces according to aspects of the invention.

FIG. 3 depicts a flow diagram of an exemplary method 300 in accordance with aspects of the invention. The method 300 caches translations of virtual addresses to system physical addresses from multiple address spaces in a virtual machine to retain as many translations as possible across address space switches. The method 300 includes write-protecting a guest address space (step 310) by removing all guest-writable mappings to the guest pages tables before caching one of the guest page table translations in a shadow page table. Next, writes to guest page tables are intercepted (step 320). After one or more write intercepts on a guest page table, a guest-writable mappings is made to the shadowed guest page table, so the translations in the corresponding shadow page tables are marked as being stale. The marked translations are then purged upon an address space switch (step 330).

Optional methods to the main method of steps 310-330 are available as aspects of the invention. For example, optional method step 340 (connector 330 to 340 shown dotted) is a start of one optional method from step 330 as are optional steps 410, 430, 450 and 470. The guest-writable mappings to the set of tracked guest page tables are tracked (step 340). The set of tracked guest page tables is built up dynamically based on the guest page tables walked in resolving address translations. The optional method step 340 enhances the efficiency of write-protecting GPTs. Write-protecting tracked GPTs involves removing the tracked guest-writable mappings to them, but write-protecting untracked GPTs involves scanning all SPTs to find guest-writable mappings to those GPTs. In one embodiment, write-protecting untracked GPTs is deferred, and their corresponding SPTs are marked as stale as those GPTs may have guest-writable mappings (step 350). The untracked GPTs that are shadowed are placed on a list of guest pages that are candidates for being tracked. When the number of times that untracked GPTs are shadowed exceeds a threshold, the method purges all cached translations, thus write-protecting all guest pages, and begins tracking guest-writable mappings to the previously untracked GPTs on the candidate list (step 360).

In addressing another aspect of the invention, the virtual TLB can be further optimized on processor architectures such as x86 and x86-64 that support global mappings, which are translations that are common to all address spaces. These translations do not need to be flushed from the translation look-aside buffer (TLB) when the operating system modifies the base of the page table tree upon an address space switch. This retention of mappings helps to avoid TLB misses due to global mappings being invalidated in the TLB.

The VMM can share SPTs between shadow address spaces. This sharing allows virtual processors to load in global mappings cached on shared page tables in a batched fashion into every single shadow address space upon the first page fault on a virtual address translated by that shared page table, reducing the number of page faults that occur when compared to an implementation that does not share SPTs between shadow address spaces. When a fault occurs, the VMM looks to see if there is an SPT that already caches the translation. If there is, the SPT is linked into the SPDT of the current shadow address space, thus bringing in the other translations on that SPT in bulk.

As an aspect of the present invention, the VMM may detect when global mappings in the SPTs become stale, just as it does with non-global mappings as mentioned above. Therefore, upon a modification to the PGE bit of the CR4 control register, which requires both global and non-global translations that are stale to be flushed, the shadow page tables can be synchronized to the guest page tables in the same way that they are synchronized on an address space switch resulting from a write to CR3. This allows the virtual TLB to avoid having to perform an indiscriminate flush of the entire TLB upon a change to the PGE bit of CR4, which x86 operating systems use to synchronize the global mappings. Avoiding an indiscriminate purge of the SPTs preserves many mappings that are still valid in shadow page tables. This results in longer retention of global mappings cached in the shadow page tables.

It is noted that one complication may arise in sharing SPTs between shadow address spaces. The VMM may propagate attribute flags in the upper-level guest page tables such as the guest page directory table (GPDT) into the lowest-level SPT, so the SPT effectively caches information not just from the GPT but also from the GPDT referencing it. Thus, each SPT shadows not only a specific GPT but also a specific set of GPDT entry attributes. However, as an aspect of the invention, the VMM takes this into account when looking for an existing SPT that shadows a particular GPT, by also checking to see if the shadow page table shadows the desired GPDT entry attributes. This is preferred to ensure correctness, since each shadow address space must preserve the access permissions specified throughout the guest page table tree even if it shares the SPTs with other shadow address spaces. This same technique is also applied to the processor control register flags, such as the PSE bit in the CR4 register which determines whether large pages are supported by the processor. Thus, each SPT also shadows a particular set of control register flags, and those flags are taken into account when looking for an existing SPT that shadows a particular GPT.

In another aspect of the invention, the shadow page tables and even the shadow address spaces can be shared between different virtual processors. In a manner similar to the sharing of SPTs between shadow address spaces on the same virtual processor described earlier, when a page fault occurs, the virtual processor first looks for an existing SPT that may already contain the cached translation and if one exists, links it into its current SAS, thereby bringing in all address translations cached in that SPT. Therefore, when an address translation is cached on one virtual processor, it is available to other virtual processors as well. Similarly, the virtual processors can share the shadow address spaces currently in the virtual TLB, so when an address space switch occurs, the virtual processor looks for an existing SAS that shadows the guest address space being switched to. In this respect, the software solution differs from the hardware solution, in which there typically exists one TLB for each processor and address translations cached in the TLBs are not shared between processors.

Sharing SPTs in this manner reduces cross-processor TLB shootdown cost by eliminating the need for communication between virtual processors via an inter-processor interrupt, because the virtual machine uses a single virtual TLB that is shared between the virtual processors. In addition, the VMM only needs to update one set of shadow page tables when it has to synchronize the virtual TLB. If the shadow page tables and shadow address spaces were not shared, it is likely that the VMM will have to make updates to multiple sets of SPTs in response to an address space switch, an indiscriminate flush of the TLB by the guest, or an invalidation of a translation for a particular virtual address. Furthermore, sharing SPTs between virtual processors leads to lower memory usage.

In some circumstances in a virtual machine, multiple workloads supported by multiple virtual processors may have more active processes and corresponding address spaces than there are shadow address spaces in the VMM. A good example is a Windows terminal server on which many users run several processes. In the worst case, the virtual processor never switches to a shadowed address space before it is evicted, thus effectively gaining no benefit from caching translations from multiple address spaces.

In one embodiment, a purge list of SPTs from evicted shadow address spaces may be maintained. When shadow address spaces are evicted, their shadow page tables can be placed on a free list from which SPTs are allocated. However, a more sophisticated approach is to place SPTs with no stale translations on a purge list such that the SPTs are not reallocated for use in another shadow address space right away. Both a free list and a purge list may be maintained. When a virtual processor eventually switches back to that address space or caches a translation from the corresponding GPTs, those SPTs and their cached translations may be on the purge list. If they are, the VMM can link an SPT back into the shadow page directory table of the shadow address space, thus bringing back in all of the translations cached by that SPT. Additionally, SPTs may be removed from the purge list if an SPT needs to be allocated but the free list is empty. This novel technique effectively uses the larger space of SPTs to retain translations from address spaces that technically are no longer shadowed, with the hope that the address space will become shadowed before the SPT is reused to shadow a different GPT. This enables the VMM to more gracefully support guests using more address spaces than the VMM has shadow address spaces.

In another aspect of the invention, on-demand random pruning of a database for tracking information on guest pages may be accomplished. In one example embodiment, the VMM can implement this database with a hash table to efficiently track information on a sparse subset of guest pages. In this instance, there may be a fixed number of objects for tracking guest pages and the guest-writable mappings to them. In this situation, the VMM may evict one of those objects at random to prune the hash table of older information. As a result, the database may reach a relatively stable state at some point. Additionally, if the database become large, the VMM may randomly purge the tracked information on a guest page to avoid the expense of the maintaining the database.

Figure 4:
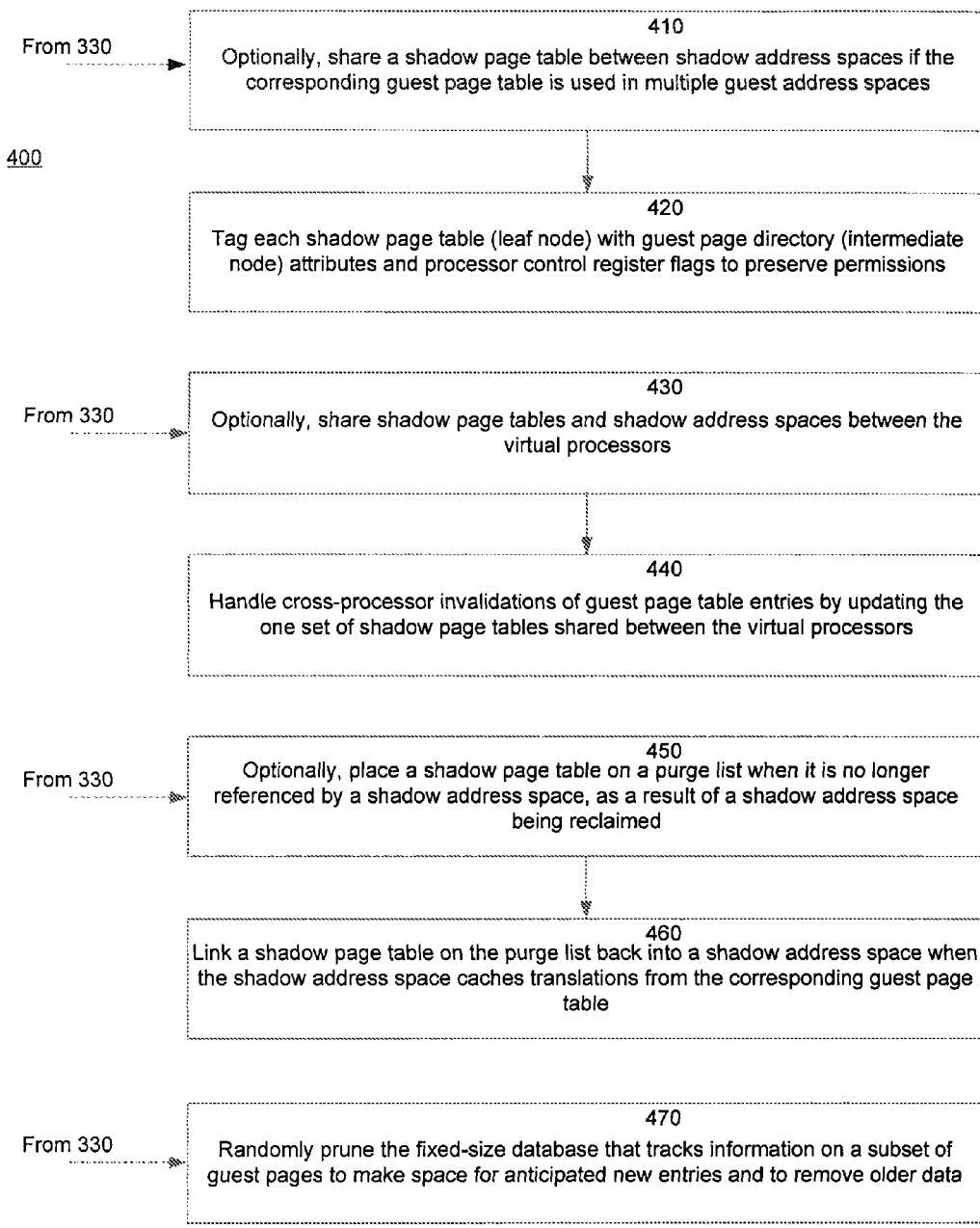
FIG. 4 is a collection of additional exemplary method options to efficiently use shadow page tables according to aspects of the invention.

FIG. 4 depicts optional embodiment methods 400 that may be exercised in addition to the method of FIG. 3. The optional method step 410 uses the shadow page tables more efficiently by reusing previously cached translations. A shadow page table may be shared between shadow address spaces (step 410) if the corresponding guest page table is used in multiple guest address spaces. Each shadow page table (leaf node) may be tagged with guest page directory (intermediate node) attributes and processor control register flags to preserve access permissions (step 420). In another option, shadow page tables and even shadow address spaces may be shared between virtual processors in a virtual machine (step 430). This allows for the efficient handling of invalidations of guest page table entries by having only one set of shadow page tables which are shared between different processors to update (step 440). In another option, shadow page tables may be placed on a purge list (step 450) when they are no longer referenced by a shadow address space as a result of a shadow address space being reclaimed. However, a subsequent guest memory access may use an address translation from a guest page table corresponding to a shadow page table on the purge list. If so, that shadow page table may be linked back into a shadow address space (step 460), bringing in the cached translations on that shadow page table in bulk. In another option, the database that tracks information on a sparse subset of guest pages such as the guest-writable mappings to those guest pages may be randomly pruned (step 470). This pruning makes space for new entries and to prune older data and avoids having to evict existing entries on time-critical paths. Eventually, the database may reach a relatively stable state as it builds up a working set of information.

In one example embodiment of the invention, a VMM page fault handler has to detect two cases: map-then-shadow and shadow-then-map. The purpose is to mark any shadow page tables caching translations from a guest page table with guest-writable mappings to it as stale. The CR3 reload handler has to locate a SAS shadowing the guest address space being switched to, else evict an existing SAS. If it finds an existing SAS, the VMM must make sure the SAS it switches to does not have stale mappings. The INVLPG handler has to remove the cached translation for the specified virtual address from the shadow page tables.

In one embodiment, upon a VMM page fault due to a guest memory access in a virtual machine emulating the x86 processor architecture, the VMM walks the GPT tree to the fault virtual address (VA) to obtain the fault GPA. If there is no VA-to-GPA translation at that virtual address, the VMM signals a page fault to the guest. Otherwise, the fault GPA may then be translated into a SPA. If the SPDT entry for the fault VA is not present or the GPDT entry has changed, the VMM may look for an existing SPT that shadows the GPT used to resolve the page fault in the hash table, as well as the GPDT entry attributes and the guest processor control register flags. If a GPT-to-SPT map is found, the VMM may connect the SPDT entry to the SPT shadowing that GPT. Otherwise, the VMM may allocate a new SPT and add a GPT-to-SPT map in the hash table. If the GPT is not already tracked by the hash table, the VMM may add it and mark it as being partially tracked, meaning that there may be guest-writable mappings to it that are unknown to the VMM. If the GPT is partially tracked, the VMM must mark the corresponding SPT as stale due to the unknown guest-writable mappings to that GPT. If the GPT is in the hash table, the VMM may efficiently write-protect that GPT by removing all of the guest-writable mappings to that GPT page by removing the corresponding VA-to-SPA translations in the shadow page tables. Then, the VMM may connect the SPDT entry to the SPT and record the back reference from the SPT to the SPDT entry. If the hash table is tracking the fault GPA and the page fault was on a write by the guest, the VMM records in the hash table a guest-writable mapping to the GPT from the SPT entry and mark any SPTs shadowing that GPT as stale. Finally, the VMM creates the VA-to-SPA mapping in the SPT entry.

In one embodiment of the invention, upon the guest executing a MOV CR3 instruction to switch address spaces in a virtual machine emulating the x86 processor architecture, if too many GPTs are partially tracked, the VMM can flush the cached translations in all of its SPTs and mark all GPT pages in the hash table as fully tracked. If the new guest CR3 is not currently shadowed by a SAS, the VMM can choose an existing SAS to evict, remove all of its mappings, and associate the evicted SAS with the new guest CR3. Otherwise, the VMM can lookup the SAS for the new guest CR3, invalidate the SPDT entries for the GPDT entries that have changed, and invalidate the SPDT entries to SPTs that are stale. Finally, the VMM loads the base of the SPT tree for the SAS into the physical CR3.

In one embodiment of the invention, upon the guest executing an INVLPG instruction in a virtual machine emulating the x86 processor architecture, the VMM can invalidate the SPT entry at the VA specified by the INVLPG instruction and execute a physical INVLPG on the VA to remove the entry from the physical TLB.

Exemplary Computing Device

Figure 5:
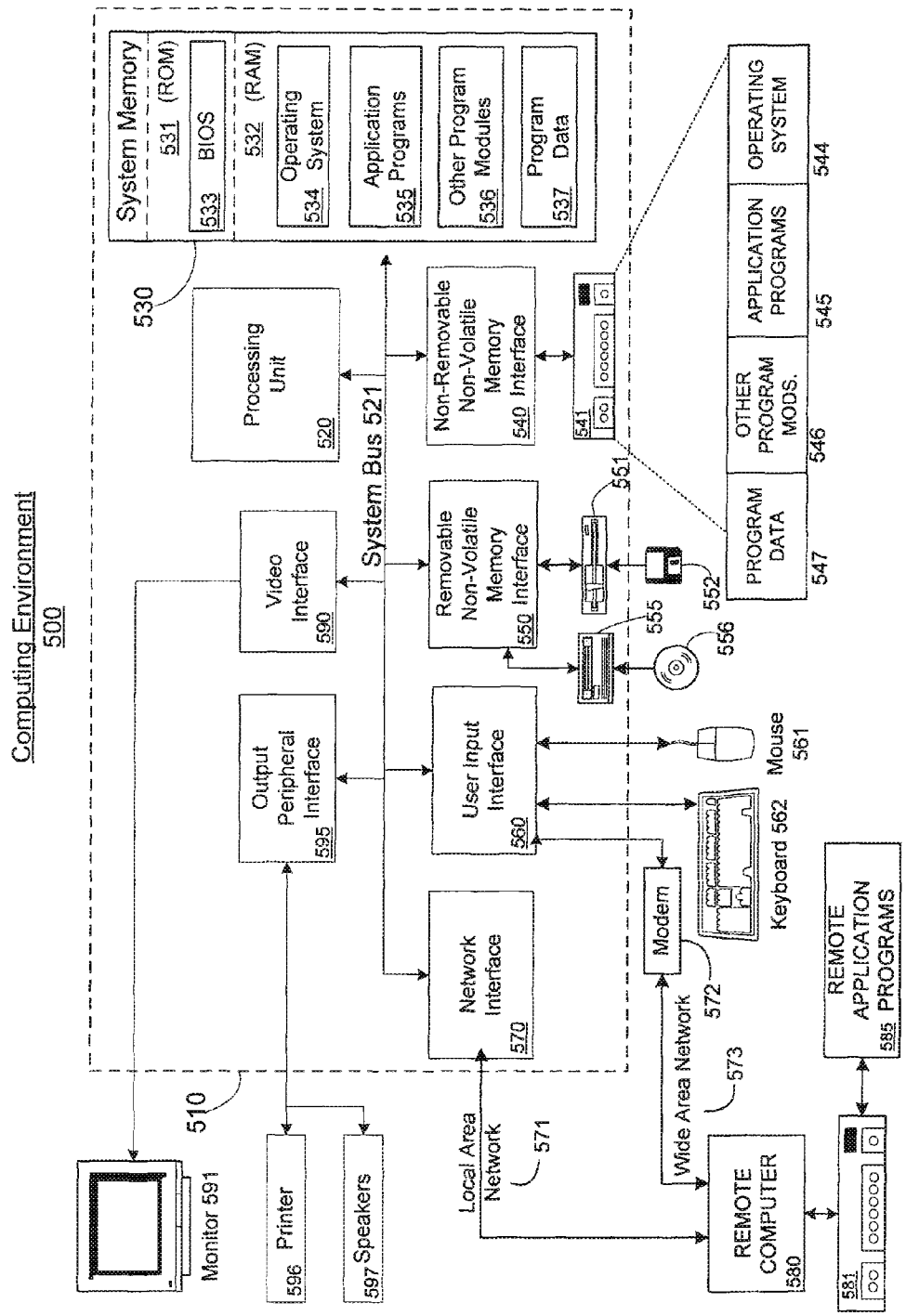
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general-purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

In the context of a virtual machine environment, the computing environment of FIG. 5 may be implemented with one or more processors where a host operating system or virtualization software may service a multiplicity of different virtual machines. In this context, the configuration of FIG. 5 provides an exemplary instance of a single CPU system with the capability to host multiple virtual machines, each having an operating system and requesting hardware resources from the host computer of FIG. 5.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures, and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well-known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers, and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general-purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer-readable media. Computer-readable media can be any available media that can be accessed by computer system 510 and includes both volatile and nonvolatile, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CD-ROM), compact disc-rewritable (CD-RW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during startup, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, non-volatile magnetic media, a magnetic disk drive 551 that reads from or writes to a removable, nonvolatile magnetic disk 552, and an optical disk drive 555 that reads from or writes to a removable, nonvolatile optical disk 556, such as a CD-ROM, CD-RW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer-readable instructions, data structures, program modules, and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port, or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device, or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement efficient virtualization of memory in a virtual machine environment through an cache of address translations from multiple address spaces. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high-level procedural or object-oriented programming language to communicate with a computer. However, the program(s) can be implemented in assembly or machine language, if desired. In any case, the language may be a compiled or interpreted language, and combined with hardware implementations.

While aspects of the present invention have been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application-specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of caching translations of virtual addresses (VA) to system physical addresses (SPA) from multiple address spaces in a virtual machine, the method comprising:
   write-protecting a guest page table containing an address translation for a first guest address space before caching the address translation in a shadow page table;
   intercepting a write to the guest page table;
   creating a guest-writable mapping to the guest page table after intercepting the write to the guest page table;
   marking a cached address translation associated with the guest page table affected by the guest-writable mapping, wherein the marking indicates a stale cached address translation;
   purging the marked address translation upon one of a switch to a second guest address space and a flush of translations, wherein non-stale address translations remain cached and stale address translations are removed;
   sharing the shadow page table between a first shadow address space that corresponds to the first guest address space and a second shadow address space that corresponds to the second guest address space when the guest page table is used in the corresponding first and second guest address spaces; and
   tagging the shadow page table with guest page directory table attributes and processor control register flags, wherein the attributes preserve access permissions.

2. The method of claim 1, further comprising:
   building a set of tracked guest pages dynamically, wherein the tracked guest pages contain tracked guest page tables and are identified as guest page tables are walked in resolving address translations;
   tracking an intercepted guest-writable mapping to a guest page in the set of tracked guest pages; and
   removing the tracked guest-writable mapping to a tracked guest page, wherein a subsequent write to the tracked guest page is intercepted.

3. The method of claim 2, further comprising:
   counting a number of times that untracked guest page tables are shadowed, wherein the untracked guest page tables have guest-writable mappings that may not be tracked;
   deferring write-protecting a guest page containing an untracked guest page table being shadowed until the number of times that untracked guest page tables are shadowed exceeds a threshold, wherein the guest page is assumed to have guest-writable mappings;
   adding the guest page containing an untracked guest page table being shadowed to a list of guest pages that are candidates for being tracked; and
   purging all cached address translations when the number of times that untracked guest page tables have been shadowed exceeds a threshold, wherein all guest pages are write-protected as a result of removing all guest-writable mappings and wherein the untracked guest pages on the candidate list become tracked guest pages as a result of write-protecting the untracked guest pages.

4. The method of claim 1, further comprising:
   sharing the shadow page table and optionally a shadow address space between two virtual processors of the virtual machine; and
   handling a cross-processor invalidation of a guest page table entry by updating the shadow page table that is shared between the two virtual processors.

5. The method of claim 1, further comprising:
   placing the shadow page table on a purge list when the shadow page table is no longer referenced by a shadow address space; and
   linking the shadow page table on a purge list back into a shadow address space when the shadow address space caches address translations from a guest page table corresponding to the shadow page table.

6. The method of claim 1, further comprising:
   randomly pruning a database that tracks information on a subset of guest pages to remove infrequently used data, make space for new entries, and avoid evicting entries on time-critical paths.

7. A system for caching translations of virtual addresses (VA) to system physical addresses (SPA) from multiple address spaces in a virtual machine, the system comprising;
   a guest program running on a host computer, the guest program and host computer comprising the virtual machine;
   a data storage resource containing:
   a guest page containing a guest page table with at least one address translation; and
   a host page containing a shadow page table with the at least one address translation; and
   a host processor having access to memory, the memory storing instructions that when executed, cause operations comprising:
   write-protecting the guest page table containing an address translation for a first guest address space before caching the address translation in a shadow page table;
   intercepting a write to the guest page table;
   creating a guest-writable mapping to the guest page table after intercepting the write to the guest page table;
   marking a cached address translation associated with the guest page table affected by the guest-writable mapping, wherein the marking indicates a stale cached address translation; and
   purging the marked address translation upon one of a switch to a second guest address space and a flush of translations, wherein non-stale address translations remain cached and stale address translations are removed; and two virtual processors operating in the virtual machine, the virtual processors sharing a shadow page table and optionally a corresponding shadow address space; and a virtual machine monitor program which handles a cross-processor invalidation of guest page table entries by updating the shadow page table that is shared between the two virtual processors.

8. The system of claim 7, wherein the method further comprises:

building a set of tracked guest pages dynamically, wherein the tracked guest pages contain tracked guest page tables and are identified as guest page tables are walked in resolving address translations;

tracking an intercepted guest-writable mapping to a guest page in the set of tracked guest pages; and removing the tracked guest-writable mapping to a tracked guest page, wherein a subsequent write to the tracked guest page is intercepted.

9. The system of claim 7, further comprising:

a software counter which counts a number of times that untracked guest page tables are shadowed, and wherein the host processor executes software to:
defer write protecting a guest page containing an untracked guest page table being shadowed until the number of times that untracked guest page tables are shadowed exceeds a threshold, wherein the guest page table is assumed to have guest-writable mappings;

add the guest page containing an untracked guest page table being shadowed to a list of guest pages that are candidates for being tracked; and purge a cached address translation when the number of times that untracked guest page tables have been shadowed exceeds a threshold, wherein guest pages are write-protected as a result of removing all guest-writable mappings and wherein the untracked guest pages on the candidate list become tracked guest pages as a result of write-protecting the untracked guest pages.

10. The system of claim 7, further comprising:

a purge list storing an indication of the shadow page table when the shadow page table is no longer referenced by a shadow address space; wherein the indication of the shadow page table stored on the purge list is linked back into the shadow address space when the shadow address space caches address translations from a corresponding guest page table.

11. A computer-readable storage medium for caching translations of virtual addresses (VA) to system physical addresses (SPA) from multiple address spaces in a virtual machine, bearing computer-readable instructions that, when executed on a processor, cause operations comprising:

write-protecting a guest page table containing an address translation for a first guest address space before caching the address translation in a shadow page table;

intercepting a write to the guest page table;

creating a guest-writable mapping to the guest page table after intercepting the write to the guest page table;

marking a cached address translation associated with the guest page table affected by the guest-writable mapping, wherein the marking indicates a stale cached address translation;

purging the marked address translation upon one of a switch to a second guest address space and a flush of translations, wherein non-stale address translations remain cached and stale address translations are removed;

placing the shadow page table on a purge list when the shadow page table is no longer referenced by a shadow address space; and linking the shadow page table on a purge list back into the shadow address space when the shadow address space caches address translations from the guest page table corresponding to the shadow page table.

12. The computer-readable storage medium of claim 11, the method further comprising:

building a set of tracked guest pages dynamically, wherein the tracked guest pages contain tracked guest page tables and are identified as guest page tables are walked in resolving address translations;

tracking an intercepted guest-writable mapping to a guest page in the set of tracked guest pages; and removing the tracked guest-writable mapping to a tracked guest page, wherein a subsequent write to the tracked guest page is intercepted.

13. The computer-readable storage medium of claim 12, further bearing computer-readable instructions, that when executed on the processor, cause operations comprising:

counting a number of times that untracked guest page tables are shadowed, wherein the untracked guest page tables have guest-writable mappings that may not be tracked;

deferring write-protecting a guest page containing an untracked guest page table being shadowed until the number of times that untracked guest page tables are shadowed exceeds a threshold, wherein the guest page is assumed to have guest-writable mappings;

adding the guest page containing an untracked guest page table being shadowed to a list of guest pages that are candidates for being tracked; and purging a cached address translation when the number of times that untracked guest page tables have been shadowed exceeds a threshold, wherein guest pages are write-protected as a result of removing all guest-writable mappings and wherein the untracked guest pages on the candidate list become tracked guest pages as a result of write-protecting the untracked guest pages.

14. The computer-readable storage medium of claim 11, further bearing computer-readable instructions, that when executed on the processor, cause operations comprising:

sharing a shadow page table between a first shadow address space and a second shadow address space when a guest page table is used in the corresponding first and second guest address spaces; and tagging the shadow page table with guest page directory table attributes and processor control register flags, wherein the attributes preserve access permissions.

15. The computer-readable storage medium of claim 11, further bearing computer-readable instructions, that when executed on the processor, cause operations comprising:

placing a shadow page table on a purge list when the shadow page table is no longer referenced by a shadow address space; and linking the shadow page table on a purge list back into a shadow address space when the shadow address space caches address translations from a guest page table corresponding to the shadow page table.

16. The computer-readable storage medium of claim 11, further bearing computer-readable instructions, that when executed on the processor, cause operations comprising:

randomly pruning a database that tracks information on a subset of guest pages to remove infrequently used data, make space for new entries, and avoid evicting entries on time-critical paths.

* * * * *